United States Patent [19]

Takehara

[11] Patent Number: 4,535,436
[45] Date of Patent: Aug. 13, 1985

[54] STYLUS HAVING A GRAPHITE ELECTRODE

[75] Inventor: Hideaki Takehara, Yokohama, Japan

[73] Assignee: Victor Company of Japan, Limited, Yokohama, Japan

[21] Appl. No.: 504,223

[22] Filed: Jun. 14, 1983

Related U.S. Application Data

[62] Division of Ser. No. 268,888, Jun. 1, 1981, Pat. No. 4,409,712.

[30] Foreign Application Priority Data

May 30, 1980 [JP] Japan .................................. 55-72517

[51] Int. Cl.³ .............................................. G11B 9/06
[52] U.S. Cl. .................................. 369/173; 29/25.42; 219/121 LM
[58] Field of Search .............................. 369/173, 170; 219/121 LM; 29/25.42

[56] References Cited

U.S. PATENT DOCUMENTS 4,212,471 7/1980 Nishiwaki et al. ................... 369/173
4,410,974 10/1983 Segawa et al. ...................... 369/173
4,439,853 3/1984 Dholakia ............................. 369/173

Primary Examiner—Steven L. Stephan
Attorney, Agent, or Firm—Lowe, King, Price & Becker

[57] ABSTRACT

A diamond body is heated in an environment of vacuum or inert gas containing a small amount of oxygen at a predetermined elevated temperature to allow the carbon atoms of the surface areas to form a layer of graphite on the diamond body. The diamond body is then lapped so that the graphite layer is shaped into the form of a stylus electrode.

6 Claims, 1 Drawing Figure

U.S. Patent  Aug. 13, 1985  4,535,436
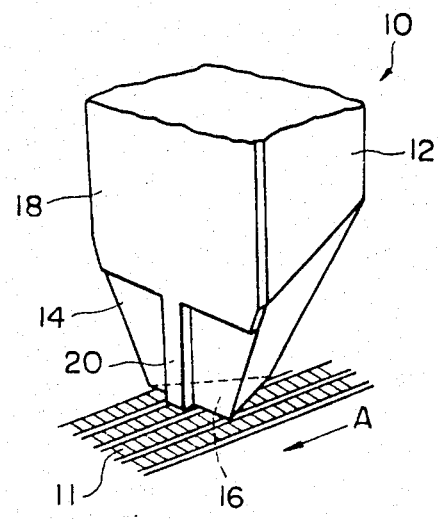

STYLUS HAVING A GRAPHITE ELECTRODE

RELATIONSHIP TO PENDING APPLICATION

The present application is a division of co-pending U.S. application Ser. No. 268,888, filed June 1, 1981, now U.S. Pat. No. 4,409,712.

BACKGROUND OF THE INVENTION

The present invention relates to a stylus for use in recording signals on a lacquer disc or reproducing signals from the record, and in particular to an electrode including a layer of graphite integrally formed on a surface of a diamond body.

In video recording and reproducing systems of the grooveless capacitance detection type, as disclosed in commonly assigned U.S. Pat. No. 4,426,660, incorporated by reference herein, the cutting stylus is formed of a diamond body for cutting the surface of a lacquer disc to form minute pits along sprial or concentric tracks. The diamond body is provided with an electrode to release electrostatic charges which build up at the diamond tip as the result of the cutting. The reproducing stylus is also formed of a diamond body which rests over several tracks and the electrode reads just one information signal from each track of a disc record by sensing its geometric surface variations. It is required that the stylus be maintained in a stable contact relation with the surface of the disc which spins at a high speed. The electrode is conventionally formed by vacuum deposition, sputtering, or ion plating of a conductive material such as halinium or titanium. Since the conductive material that forms the electrode is chemically different from the underlying body, the electrode, formed as a layer, is physically attached to the underlying body. This results in the electrode having the tendency toward separating from the underlying diamond body when subject to heat or friction which are likely to encounter during stylus manufacture or actual use. Another conventional method for making the electrode involves ion injection. Because of the strong bonding between carbon atoms that form the diamond body, it is difficult to inject enough ions to provide a highly conductive electrode.

SUMMARY OF THE INVENTION

According to the present invention, a stylus comprises a block of diamond heated within an environment of either vacuum or inert gas each containing a small amount of oxygen at an elevated temperature for purposes of removing noxious gas from the reaction chamber, a process known as "degassing". After the degassing process, the diamond body is heated at a temperature lower than the degassing temperature, preferably in a range from 1100° C. to 1500° C. under the pressure of $3 \times 10^{-2}$ Torr. to $200 \times 10^{-2}$ Torr. for a period ranging from 30 minutes to 9 hours. This heating process allows the carbon atoms of the surface areas of the diamond body to form a thin layer of graphite having a sheet resistance of as low as 600 ohms. The presence of oxygen is essential to the conversion of surface layer to graphite. The amount of oxygen contained in the reaction chamber is given by partial pressure which is preferably 1/5 of the total pressure of the reaction chamber. The diamond body is then subject to a lapping process whereby the conductive layer is shaped into the form of a stylus electrode having a width of about 1 micrometer. Being integrally formed with the underlying body, the graphite electrode is integral with i.e., not separable from, the diamond body when subject to heat or friction which might occur during use.

The above and still further objects, features and advantages of the present invention will become apparent upon consideration of the following detailed description of one specific embodiment thereof, especially when taken in conjunction with the accompanying drawing.

BRIEF DESCRIPTION OF THE DRAWING

The single FIGURE is an illustration of a stylus in accordance with the invention.

DETAILED DESCRIPTION

To form the stylus of the invention in the FIGURE a reproducing stylus 10 for grooveless capacitance discs is shown as resting over several spiral tracks 11 of a disc on which signals are stored as capacitance variations produced by minute pits. The stylus 10 comprises a diamond body 12, shaped to have a rear face 14 and a contact face 16 making contact with the track moving in the direction of the arrow A when in use. The contact face 16 has a width covering several tracks as shown and has a triangular shape in this example. On the rear face 14 of the stylus 10 is the stylus electrode 18 which is provided in accordance with the present invention. The stylus electrode 18 has a downwardly extending strip 20 making contact with one track to read only the information signal and the tracking signals on either side of the track to keep the stylus 10 on the right path by feeding current to a tracking error servomechanism, not shown.

To form the stylus of the invention a 3-mm cube of diamond was placed into an oven. The oven was evacuated to as low as 10 Torr. and the diamond body was heated at an elevated temperature of from 1200° C. to 1600° C. for a period from 5 minutes to 1 hour at a pressure of $2 \times 10^{-2}$ Torr. to $1 \times 10^{-2}$ Torr. for the purpose of removing noxious gas from the over. After the degassing process the temperature was lowered to a level in range between 1100° C. and 1500° C. and the absolute pressure of the oven was increased to a level in a range between $3 \times 10^{-2}$ Torr. and $200 \times 10^{-2}$ Torr. The reaction chamber contained a small amount of oxygen whose partial pressure ranges from $(3/5) \times 10^{-2}$ Torr. to $40 \times 10^{-2}$ Torr. Under these conditions the heat treatment process was continued for a perid from 30 minutes to 9 hours. With this heat treatment, the carbon atoms of the surface areas were converted into a black layer of graphite. The graphite layer was found to have a conductivity which depends on the period of the heat treatment. It was also found that the presence of oxygen is essential to the conversion of surface layer to graphite. Tests were conducted to ascertain the relationship between the period of the heat treatment and the sheet resistance of the conductive layer. It was found that the sheet resistance is inversely variable as a function of the period of the heat treatment. More specifically, the sheet resistance was 20 killohms, 2 killohms, 700 ohms and 600 ohms, respectively, for periods of 30 minutes, 2 hours, 4 hours and 9 hours.

Scoring tests indicate that the conductive layer is not separable from the underlying body. It is considered that there is a smooth transition from the diamond body to the graphite layer which accounts for the strong bonding with which they are tied together.

The same results were obtained when the diamond body was heat-treated in an environment of an inert gas containing a small amount of oxygen.

After the heat treatment processes, the diamond body was subject to a lapping process to shape the conductive layer into the form of a stylus electrode having a width smaller than the width of a recording track.

What is claimed is:

1. A stylus for use in recording signals on a lacquer disc record or reproducing signals from a lacquer disc record, comprising a body of diamond and an electrode attached to a surface of said diamond body, said electrode comprising a layer of graphite which is integrally formed with the diamond body, said graphite layer being formed by heating said diamond body in an environment of vacuum or inert gas containing a small amount of oxygen at an elevated temperature in a range from 1100° C. to 1500° C.

2. A stylus as claimed in claim 1, wherein said graphite layer is formed by heating said diamond body at a pressure within a range between $3 \times 10^{-2}$ Torr. and $200 \times 10^{-2}$ Torr.

3. A stylus as claimed in claim 2, wherein said heating is continued for a period up to approximately 9 hours.

4. A stylus as claimed in claim 1 wherein said oxygen has a partial pressure of from $(0.6) \times 10^{-2}$ Torr. to $40 \times 10^{-2}$ Torr.

5. A stylus as claimed in claim 1 wherein said oxygen has a partial pressure of from $(0.6) \times 10^{-2}$ Torr. to $40 \times 10^{-2}$ Torr.

6. A stylus as claimed in claim 3 wherein said oxygen has a partial pressure of from $(0.6) \times 10^{-2}$ Torr. to $40 \times 10^{-2}$ Torr.

* * * * *